Patented Mar. 30, 1943

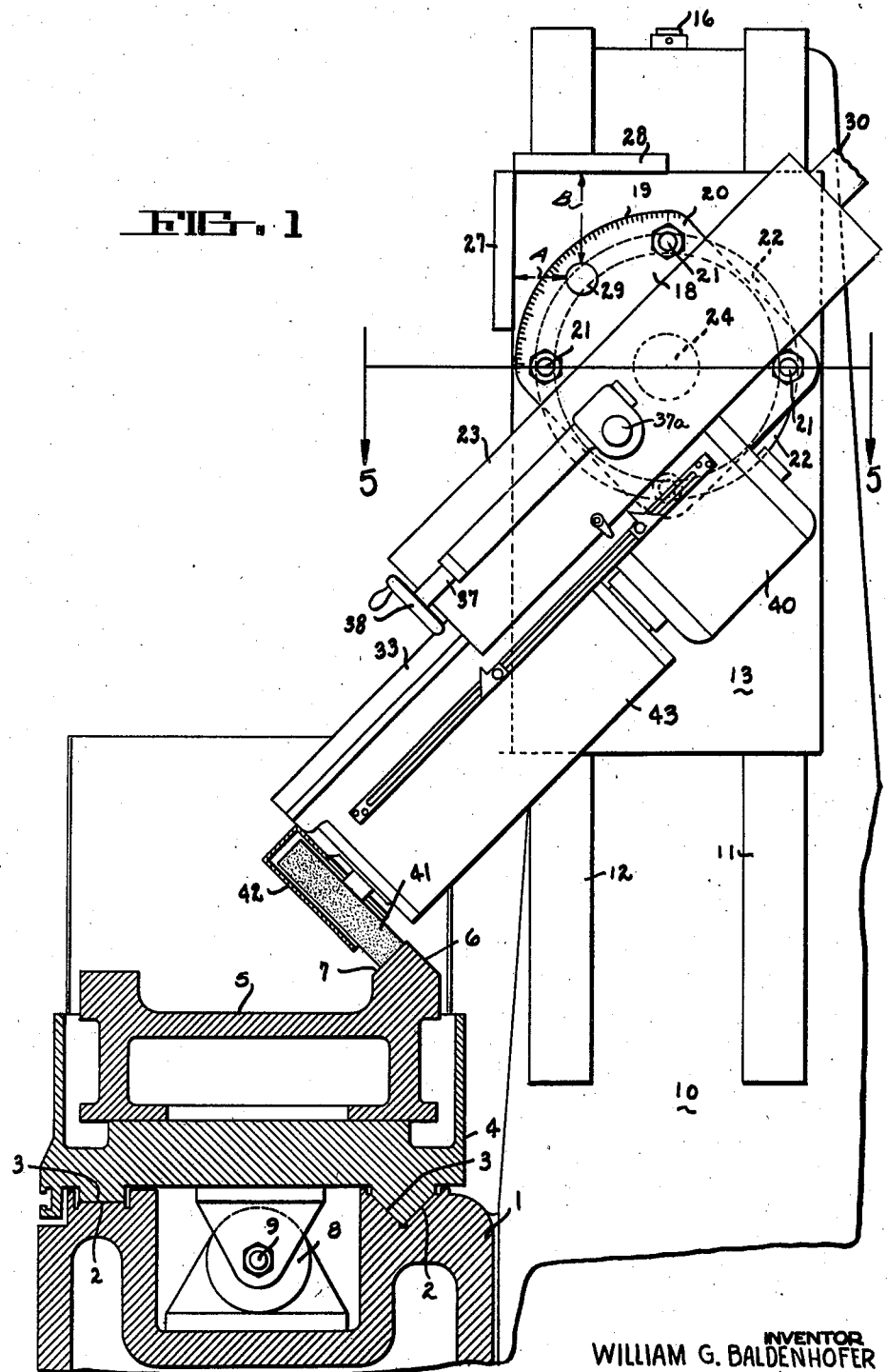

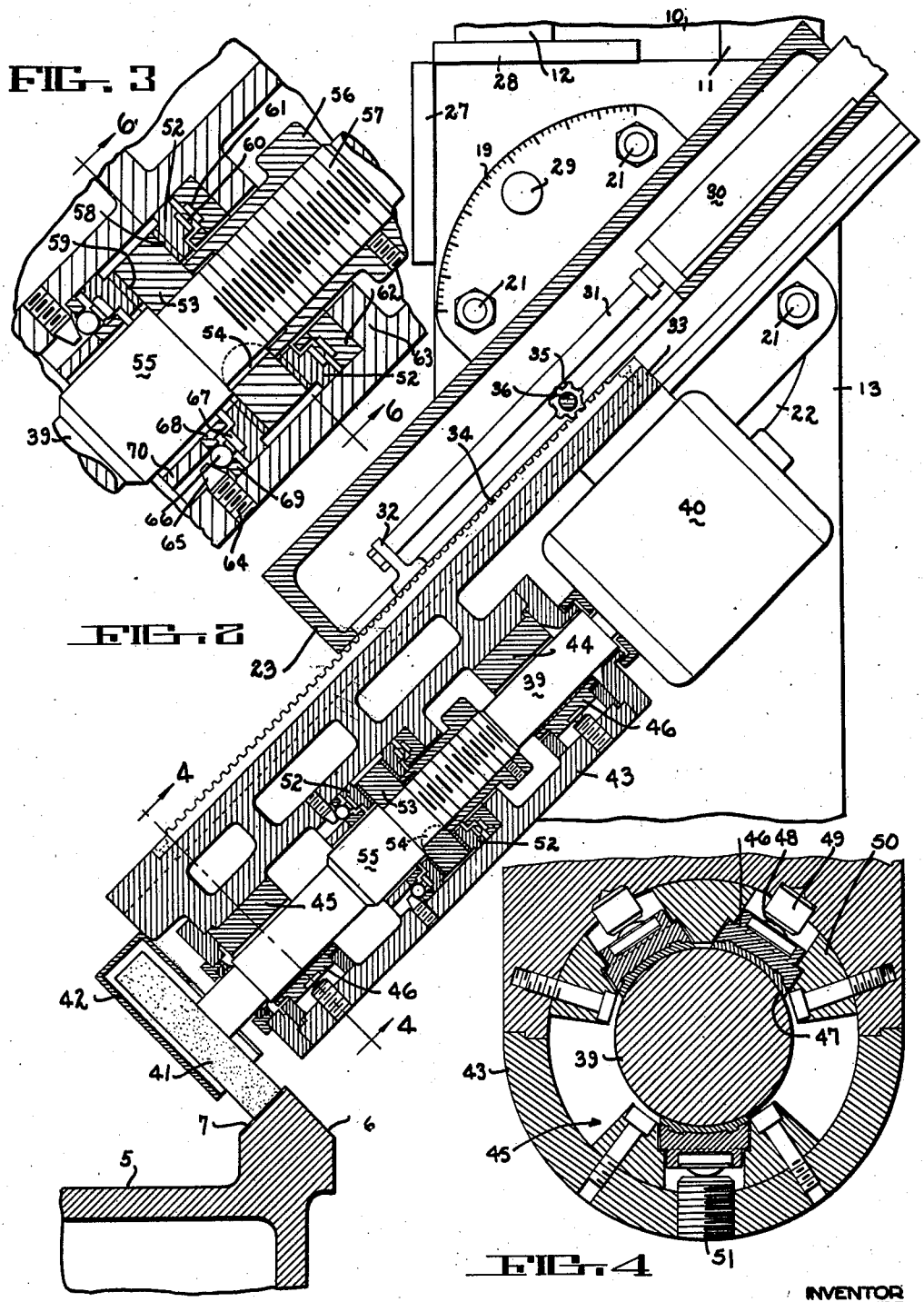

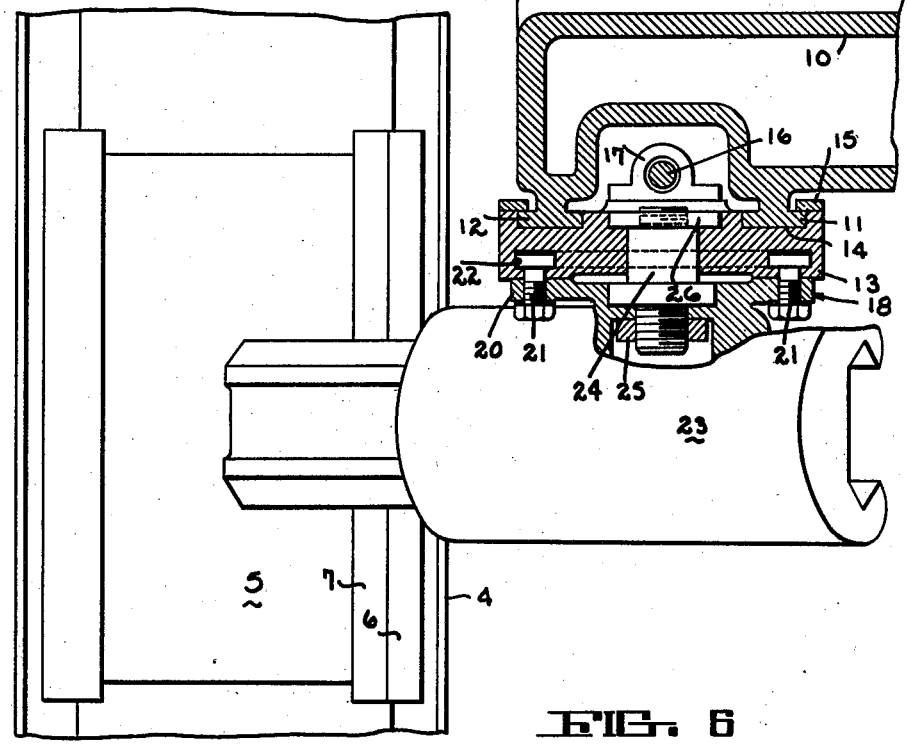
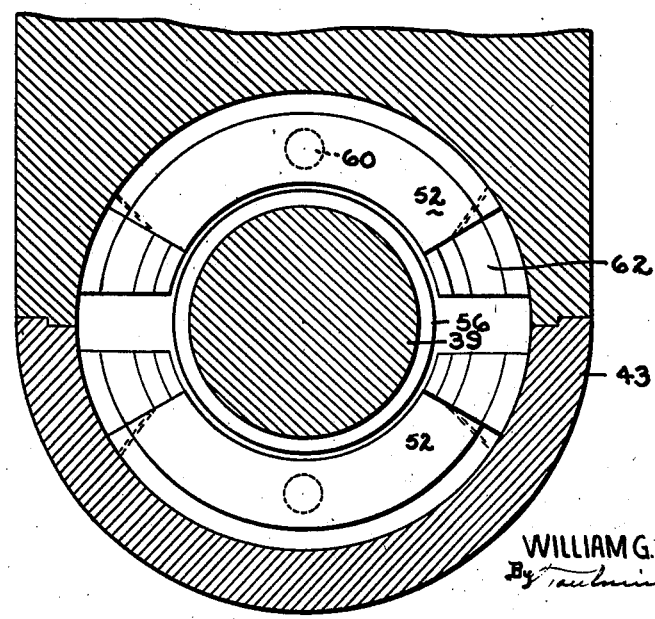

2,315,104

UNITED STATES PATENT OFFICE 2,315,104

INCLINABLE GRINDER SPINDLE

William G. Baldenhofer, Springfield, Ohio, assignor to The Thompson Grinder Company, Springfield, Ohio, a corporation of Ohio Application November 12, 1941, Serial No. 418,648

10 Claims. (Cl. 51—166)

My invention relates to grinding machinery and particularly to an inclinable grinder spindle and supporting mechanism.

It is the object of this invention to provide a mechanism using a conventional flat faced grinding wheel adapted to grind angular surfaces of varying angularity and to grind such surfaces with precision without the use of grinding wheels dressed to the desired angle.

It is a further object to provide means of taking the load and thrust irrespective of the angularity of the driving mechanism and the spindle and to provide a simple and accurate means for adjustment.

It is a further object to provide means of taking the thrust from gyratory movement of the spindle shaft due to the weight of the motor rotor on one end of the shaft and the grinding wheel on the other end.

Heretofore, angular surface grinding has been accomplished with the grinding wheels dressed to the desired angle, the wheel spindle being mounted for rotation in a horizontal plane. Spindles mounted for angular adjustment from the horizontal toward the vertical, and carrying wheels dressed parallel to their axis have been attempted, because of the advantages to be obtained thereby, namely, flexibility and accuracy of control. These attempts have resulted in partial failure, however, because of the impracticability of the spindle bearings employed, particularly the thrust bearings. Obviously, increased loads of varying magnitude are imposed upon the bearings when the spindle is swung from the usual horizontal position. Ball thrust bearings are unsuitable for such loads because of their shifting tendencies due to the centrifugal forces operating to throw the balls from their races at high speed rotation; and special bearings of an alternate steel and bronze plate construction have failed because of excesssive friction and severe overheating even when lubricated under pressure. Neither of these bearings, nor any others previously employed could be adjusted to the minute clearances required for precision grinding, without producing rapid wear or binding at the bearing surfaces.

This invention makes possible the angular positioning of the spindle of a surface grinder by providing a thrust bearing perfectly suited to the requirements. It is a bearing in which individual bearing shoes engage a shoulder on the spindle, the thrust of the shoes being taken by hardened spherical inserts, and sufficient freedom of movement of the shoes being permitted that they will adapt themselves to the shoulder or to the natural shape of a lubricating film on the shoulder by rocking on these inserts. Radial bearings of similar construction are employed, their advantages being identical with those of the thrust bearing, but their effect being of less vital importance in an inclinable spindle.

External take-up means are provided for the bearings, and, through such means, the bearings are preadjusted with virtually a zero clearance against the spindle. This close adjustment affords extreme accuracy and freedom from play and vibration in the rotating spindle, and, because of the design of the shoe supports, gives rise neither to excessive wear nor overheating. Since the shoes are free to rock in any direction, a tapered oil film of optimum shape forms between them and the spindle; and, since they are supported by the point-contact of two spherical surfaces, heavy thrusts on the shoes result in sufficient deflection of the inserts to relieve the working surfaces of forces dangerous to the maintenance of the oil film.

Referring to the drawings:

Figure 1 is a side elevation with the bed of the grinding machine in section and with the ways of a lathe bed being ground also in section.

Figure 2 is a similar view with the inclinable spindle housing and bearing mechanism in section.

Figure 3 is an enlarged view of the thrust bearing and its adjusting mechanism for the spindle.

Figure 4 is a section on the line 4—4, looking in the direction of the arrows, on Figure 2.

Figure 5 is a plan view with the column, elevating mechanism and angular adjusting mechanism for the saddle and spindle in section.

Figure 6 is a section on the line 6—6, looking in the direction of the arrows, on Figure 3.

Referring to the drawings in detail, 1 designates a base of a grinding machine or tool provided with ways 2 which receive the ways 3 of reciprocating carriage 4 which carries the work piece 5 having the angular ways 6 and 7 that are to be ground. The work piece and carriage are reciprocated by the usual hydraulic mechanism such as the cylinder 8 and piston rod 9. The bed 1 is provided with a vertical column 10 on which are mounted the vertically disposed guides 11 and 12. These guides or ways 11 and 12 serve to guide the vertical slide 13 which has cooperating guide ways 14 and carries retaining plates 15 which retain the guides 11 and 12 in the guide ways 14. The vertical adjustment of the vertical slide is accomplished by rotating the screw 16 in the block 17 which is carried on the inner face of the vertical slide 13. The vertical slide 13 carries a rotatable swivel plate 18 having graduations 19 on the flange 20. This plate carries a series of retaining bolts 21, which are mounted in a retaining slot 22 in the face of the vertical slide 13 so that this swivel plate may be rotatably adjusted upon the face of the vertical slide. The swivel plate 18 carries on its outer face the saddle 23. This saddle is mounted for rotative movement on the vertical slide 13 by the pivot pin 24 and the retaining nuts 25 and 26. Thus the saddle 23 can be adjustably rotated with the plate 18 and clamped in any angular position by the bolts 21. In order to determine this angularity and to measure it accurately the vertical abutment plate 27 and the horizontal abutment plate 28 are mounted on the side and top of the vertical slide 13 respectively. There is also mounted a stud or ball 29 on the swivel plate 18. The distance $a$ from the face of the plate 27 to the surface of the stud 29 can be measured by gage blocks and the distance from the plate 28 to the stud 29 marked $b$ can be measured by the gage blocks. Thus, it is possible to secure accurate measurement of the exact angular adjustment desired in order to grind the particular angularity on the surface with which the grinding wheel is to be brought in contact.

Actuation of the spindle carriage

The saddle 23 carries a cylinder 30 in which operates a piston rod 31 which is connected at its outer end to a bracket 32 that is mounted upon the spindle housing 33. Through this hydraulic mechanism the spindle housing is automatically actuated so that the wheel is inched across the surface to be ground as the working surface is reciprocated with respect to the wheel. This inching takes place at the end of each reciprocatory stroke.

The spindle housing 33 carries a rack 34 engaging with the pinion 35 on a shaft 36 which in turn is engaged by an actuating shaft 37 having suitable worm gearing. This shaft is actuated by the handle 38. In this manner the spindle housing 33 is adjusted with respect to the saddle 23. A clutch knob 37a is provided for disengaging the manual means 37 and 38 during automatic reciprocation of the spindle housing by the power cylinder 30.

Spindle and spindle bearings

The spindle housing 33 is adapted to support a spindle shaft 39 which has a motor 40 at one end. This motor is mounted on a bracket upon the housing 33 and has its armature on the upper end of the shaft 39. The lower end of the shaft carries the grinding wheel 41 which rotates within the guard housing 42. This wheel is a flat wheel and is not specially dressed to any particular configuration. By being held in an angular position accurately it can grind the way face 7 to the desired angle.

A tubular portion 43 of the spindle housing 33 is provided at its upper end with a radial bearing having multiple shoes, which bearing takes up any transverse load on the shaft and resists a gyratory whip of the shaft. A similar bearing is located at the bottom of the shaft. These bearings are generally designated 44 and 45.

The precise nature of such bearings is shown in Figure 4. They consist of floating shoes 46 having bearing metal surfaces 47 on the side toward the spindle shaft engaging the shaft and a rear point-to-point bearing mechanism consisting of the arcuate surface 48 and the bearing block 49. These shoes 46 are positioned and retained by the blocks 50. One of the three shoes has its arcuate surface 48 engaged by an adjusting block screw 51. Through this means all the multiple shoes are adequately adjusted.

Thrust bearing mechanism

The thrust bearing mechanism of this invention in this combination makes it possible to use a spindle shaft with a flat faced grinding wheel at any angle.

The bearing about to be described in this combination has made it possible to secure the adjustment to the minute clearances for precision grinding without producing overheating, rapid wear, or binding at the bearing surfaces.

By providing this combination of individual bearing shoes hereinafter described with the individual bearing shoes of the bearings 44 and 45 the result can be secured. In the bearings shown in detail in Figure 3, the individual bearing shoes 52 engage a shoulder plate or thrust collar 53 keyed by the key 54 to the spindle shaft and held between the shoulder 55 on the shaft and the inner end of a collar 56 threaded on the shaft at 57. Between the shoes 52 and the collar 53 are the bearing metal plates 58 and 59. The thrust of these shoes is taken on one side by spherical inserts 60 engaging the flat inserts 61 mounted in the plates 62 which are positioned by the inwardly disposed shoulder 63 of the spindle housing 43. On the opposite side the shoes are adjusted by the take-up screws 64 whose inner tapered heads 65 engage the thrust ball 66 which bear against the thrust points or faces 67. There is sufficient freedom of movement of the shoes 52 within the plates 62 to permit them to adapt themselves to the collar 53 or to the natural shape of a lubricating film on the thrust collar 53 as these shoes rock on the inserts. The external take-up means 64 enables the bearings to be preadjusted with virtually a zero clearance. This close adjustment affords extreme accuracy and freedom from play and vibration in the rotating spindle and prevents excessive wear and overheating. Since the shoes are free to rock in any direction, a tapered oil film of optimum shape forms between them and the thrust collar 53 just as the same thing takes place between the shoes 46 and the spindle shaft 39. The same principle applies to all three bearings. The point contact of the thrust point on the bearing plate permits of accommodating the heavy thrusts on the shoes so that sufficient deflection of the inserts relieves the working surfaces of forces dangerous to the maintenance of the oil film. Thus, these bearing members, whether engaging the thrust collar or the spindle shaft, are free to form automatically the most efficient natural oil film required by each different combination of angular inclination, load, speed, viscosity and temperature to which the bearing is subjected. This accommodation is markedly facilitated by the combination of the bearings not providing for both load and thrust.

The ball 66 rides within the inner collar 68 and outer collar 69. The inner collar is positioned by the inward extending shoulder 70 formed in the spindle housing 43.

It will be understood that I desire to comprehend within my invention such modifications as come within the scope of the claims and the invention.

Having thus fully described my invention what I claim as new and desire to secure by Letters Patent is:

1. In an inclinable grinding wheel shaft assembly the combination of a housing, a shaft carrying a bearing plate, rocking shoes engaging said plate, bearing points on said shoes engaging abutments in said housing so that the shoes can rock, and adjusting means of bringing said shoes, plates, and bearing supports in adjusted relationship to receive and carry the longitudinal thrust and load of the inclined spindle shaft, said adjusting means comprising tapered adjusting screws, balls engaged thereby on one side, said balls being engaged by the bearing points on one of the shoes on the other side, and means of positioning said balls within said housing.

2. In an inclinable grinding wheel shaft assembly the combination of a housing, a shaft carrying a bearing plate, rocking shoes engaging said plate, bearing points on said shoes engaging abutments in said housing so that the shoes can rock, and adjusting means of bringing said shoes, plates, and bearing supports in adjusted relationship to receive and carry the longitudinal thrust and load of the inclined spindle shaft, said adjusting means comprising tapered adjusting screws, balls engaged thereby on one side, said balls being engaged by the bearing points on one of the shoes on the other side, means of positioning said balls within said housing, and end bearings for said shaft comprising peripherially arranged multiple rocking shoes engaging the shaft, rocking bearing members on said shoes for engaging bearing faces in the housing, means for guiding said shoes while preventing their rotation with the shaft, and a common adjustment for all of said shoes and said shaft.

3. In a grinding machine having an inclined spindle, means for vertically positioning a grinding wheel assembly, comprising a spindle, motor and grinding wheel, means for reciprocating said assembly, means for rotatably positioning said assembly to determine its angularity, said means comprising a carrying saddle, an adjustably rotating plate carrying a measuring abutment, measuring abutments mounted on said vertical positioning means disposed angularly with respect to each other, said measuring abutment on said rotating plate moving in an arcuate path within the included angle of said measuring abutments on said positioning means whereby the angularity of the grinding wheel assembly can be determined by measuring the distance between the measuring abutment on the plate and the measuring abutments on the vertical positioning means.

4. In a grinding machine comprising a grinding wheel assembly, means for angularly positioning said assembly, means for vertically positioning said assembly, right angle abutment means on said vertical positioning means cooperating with a measuring abutment means on said angularly positioning means movable within the included angle of said right angle means the distance between which when measured will determine the angularity of the assembly, and means for anchoring said assembly in a predetermined angular position after its position has been so measured whereby the angularity of a grinding wheel on an assembly will be determined with respect to the work piece.

5. In a grinding machine, a vertical support, means of guiding a carrying slide thereon, means of actuating said slide comprising a worm and nut, a plate rotatably mounted on the face of said slide, means of fixing said plate at different angular positions on said slide, and a common supporting bolt mounted in said slide supporting said rotatable plate and said nut.

6. In a grinding machine, a spindle shaft adapted to be disposed angularly with respect to the horizontal, a bearing plate mounted on said spindle shaft, a plurality of floating bearing shoes engaging each side of said bearing plate, said shoes on each side of said plate comprising arcuate segments that cooperate to provide a substantially complete circular bearing face engaging said bearing plate, and means for independently adjusting each of the bearing shoes on one side of said bearing plate to thereby apply pressure on one side of said bearing plate to adjust the clearance of said shoes on the opposite side of said bearing plate.

7. In a grinding machine, a spindle shaft adapted to have a major axial thrust load imparted thereto, a bearing plate mounted intermediate the ends of said shaft, a plurality of bearing shoes engaging opposite sides of said bearing plate, said shoes comprising arcuate segments that cooperate to form a substantially continuous circular bearing surface upon each of the opposite sides of said bearing plate, point contact means projecting from each of said shoes engaging support means adjacent said spindle to provide a rocking support for each of said shoes relative to said bearing plate, and independent means for adjusting each of said shoes on one side of said bearing plate to thereby adjust the working clearance for the shoes on the opposite side of said bearing plate.

8. In a grinding machine, a housing, a spindle shaft extending through said housing, said housing and said spindle being adapted to be disposed angularly with respect to the horizontal, a bearing plate mounted on said shaft intermediate the ends thereof, a plurality of bearing shoes engaging each of opposite faces of said bearing plate, said bearing shoes comprising arcuate segments that cooperate to produce a substantially continuous circular bearing surface on opposite faces of said bearing plate, point support means projecting from each of said bearing shoes, support means carried by said housing engaged by said point support means on said shoes for rockingly mounting said bearing shoes relative to said bearing plate, and means for adjusting the bearing shoes on one side of said bearing plate to thereby move said bearing plate relative to the shoes on the opposite sides thereof and adjust the working clearance therebetween.

9. In a grinding machine, a housing, a spindle shaft extending through said housing, said housing and said spindle being adapted to be disposed angularly with respect to the horizontal, a bearing plate mounted on said shaft intermediate the ends thereof, a plurality of bearing shoes engaging each of opposite faces of said bearing plate, said bearing shoes comprising arcuate segments that cooperate to produce a substantially continuous circular bearing surface on opposite faces of said bearing plate, point support means projecting from each of said bearing shoes, support means carried by said housing engaged by said point support means on said shoes for rockingly mounting said bearing shoes relative to said bearing plate, means for adjusting the bearing shoes on one side of said bearing plate to thereby move said bearing plate relative to the shoes on the opposite sides thereof and adjust the working clearance therebetween, end bearing means supported within said housing engaging said spindle shaft about the periphery of said shaft means rockingly supporting said end bearing means, and means for adjusting the working clearance between said end bearing means and said spindle shaft.

10. In a grinding machine, a housing, a spindle shaft extending through said housing, said housing and said spindle being adapted to be disposed angularly with respect to the horizontal, a bearing plate mounted on said shaft intermediate the ends thereof, a plurality of bearing shoes engaging each of opposite faces of said bearing plate, said bearing shoes comprising arcuate segments that cooperate to produce a substantially continuous circular bearing surface on opposite faces of said bearing plate, point support means projecting from each of said bearing shoes, support means carried by said housing engaged by said point support means on said shoes for rockingly mounting said bearing shoes relative to said bearing plate, means for adjusting the bearing shoes on one side of said bearing plate to thereby move said bearing plate relative to the shoes on the opposite side thereof and adjust the working clearance therebetween, end bearing means for opposite ends of said spindle shaft, each of said end bearing means consisting of a plurality of shoes positioned around the periphery of said shaft, means for rockingly mounting each of said shoes, and means for adjusting one of said shoes of each of said end bearing means to thereby adjust the working clearance of all of said shoes of each of said end bearing means simultaneously.

WILLIAM G. BALDENHOFER.